US012561092B2

(12) United States Patent
You

(10) Patent No.: US 12,561,092 B2
(45) Date of Patent: Feb. 24, 2026

(54) MEMORY DEVICE AND STORAGE DEVICE INCLUDING THE SAME

(71) Applicant: SK hynix Inc., Gyeonggi-do (KR)

(72) Inventor: Byoung Sung You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 224 days.

(21) Appl. No.: 18/311,893

(22) Filed: May 4, 2023

(65) Prior Publication Data

US 2024/0201900 A1 Jun. 20, 2024

(30) Foreign Application Priority Data

Dec. 16, 2022 (KR) ........................ 10-2022-0177124

(51) Int. Cl.
*G06F 3/00* (2006.01)
*G06F 3/06* (2006.01)
*G06F 12/0802* (2016.01)

(52) U.S. Cl.
CPC .......... *G06F 3/0659* (2013.01); *G06F 3/0626* (2013.01); *G06F 3/064* (2013.01); *G06F 3/0604* (2013.01); *G06F 3/061* (2013.01);

*G06F 3/0656* (2013.01); *G06F 3/0658* (2013.01); *G06F 3/0679* (2013.01); *G06F 12/0802* (2013.01)

(58) Field of Classification Search
None
See application file for complete search history.

(56) References Cited

U.S. PATENT DOCUMENTS

| | | | |
|---|---|---|---|
| 6,697,939 B1 * | 2/2004 | Kahle | G06F 9/3836 |
| | | | 712/240 |
| 9,859,011 B1 * | 1/2018 | Konno | G11C 16/3427 |
| 2010/0079904 A1 * | 4/2010 | Sato | G06F 3/0608 |
| 2021/0174224 A1 | 6/2021 | Sharon et al. | |

FOREIGN PATENT DOCUMENTS

KR 10-2013-0102393 A 9/2013

* cited by examiner

*Primary Examiner* — Midys Rojas
(74) *Attorney, Agent, or Firm* — IP & T GROUP LLP

(57) ABSTRACT

A memory device includes a cell region, a buffer region, and a control circuit configured to: sequentially store read commands in a queue, and control the cell region and the buffer region to perform grouped read operations of outputting respective data blocks requested by the respective read commands.

18 Claims, 11 Drawing Sheets

FIG. 3

| P0 | ACTIVATE GROUPED READ OPERATIONS |
|----|----------------------------------|
| P1 | REFERENCE SIZE |
| P2 | QUEUE DEPTH |
| P3 | RESERVED |

| | | |
|---|---|---|
| RCMD1 | TMR1 | 4KB |
| RCMD2 | TMR2 | 8KB |
| RCMD3 | TMR3 | 16KB |
| RCMD4 | TMR4 | 4KB |

MEMORY DEVICE AND STORAGE DEVICE INCLUDING THE SAME

CROSS-REFERENCES TO RELATED APPLICATION

The present application claims priority under 35 U.S.C. § 119(a) to Korean patent application number 10-2022-0177124, filed on Dec. 16, 2022, which is incorporated herein by reference in its entirety.

BACKGROUND

1. Technical Field

Embodiments of the present disclosure relate to a storage device including a memory device.

2. Related Art

A storage device may be configured to store data provided from an external device, in response to a write request of the external device. The storage device may also be configured to provide the stored data to the external device in response to a read request of the external device. The external device may be an electronic device capable of processing data, for example, a computer, a digital camera, a mobile phone, or the like. The storage device may be embedded in the external device, or may be manufactured in a detachable form and connected to the external device. The storage device may include a memory device for storing data and a controller for controlling the memory device.

The storage device may frequently perform a read operation (for example, a random read operation) on small-sized data. Therefore, when the storage device efficiently processes the random read operation, the operating performance of the storage device may be greatly improved.

SUMMARY

Various embodiments of the present disclosure are directed to providing a memory device capable of reducing the latency of a read operation and a storage device including the same.

A memory device in accordance with an embodiment of the present disclosure may include: a cell region; a buffer region; and a control circuit configured to: sequentially store read commands in a queue, and control the cell region and the buffer region to perform grouped read operations of outputting respective data blocks requested by the respective read commands.

A memory device in accordance with an embodiment of the present disclosure may include: a cell region; and a control circuit configured to: set a queue depth and a reference size in response to a set command, compare a data size of a read command with the reference size when storing the read command in a queue, and allocate an index to the read command according to a result of the comparison.

A storage device in accordance with an embodiment of the present disclosure may include: a memory device; and a controller configured to: sequentially transmit read commands to the memory device, and sequentially receive data blocks respectively corresponding to the read commands from the memory device.

A memory device in accordance with an embodiment of the present disclosure may include: at least a plane including pages of memory cells, each page storing page data; and a control circuit configured to perform a sequence of first and second read operations in response to a plurality of at least first and second read commands, respectively. Each of the first and second read operations may include: a read task of reading page data from the plane to buffer the read data, and an output task including first and second sub-tasks, the first sub-task being caching the buffered data and the second sub-task being outputting the cached data to an external device. The output task of the first read operation may overlap the read task of the second read operation according to a pipelining scheme.

A memory device and a storage device including the same in accordance with an embodiment of the present disclosure can reduce the latency of a read operation.

BRIEF DESCRIPTION OF THE DRAWINGS

FIG. 3 is a circuit diagram illustrating a memory block in accordance with an embodiment of the present disclosure.

DETAILED DESCRIPTION

Figure 1:
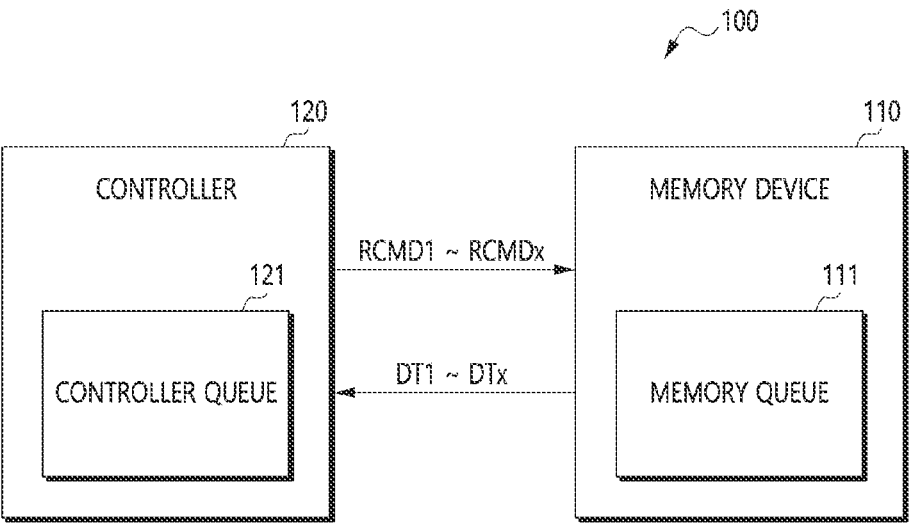
FIG. 1 is a block diagram illustrating a storage device in accordance with an embodiment of the present disclosure.

In the present disclosure, advantages, features and methods for achieving them will become more apparent after a reading of the following embodiments taken in conjunction with the accompanying drawings. The present disclosure may, however, be embodied in different forms and should not be construed as being limited to the embodiments set forth herein. Rather, these embodiments are provided to describe the present disclosure in detail to the extent that a person skilled in the art to which the disclosure pertains can easily enforce the technical concept of the present disclosure.

It is to be understood herein that embodiments of the present disclosure are not limited to the particulars shown in the drawings and that the drawings are not necessarily to scale and in some instances, proportions may have been exaggerated in order to more clearly depict certain features of the disclosure. While particular terminology is used herein, it is to be appreciated that the terminology used herein is for the purpose of describing particular embodiments only and is not intended to limit the scope of the present disclosure.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, embodiments of the present disclosure will be described in detail with reference to the drawings.

FIG. 1 is a block diagram illustrating a storage device 100 in accordance with an embodiment of the present disclosure.

The storage device 100 may be configured to store data received from an external device, for example, a host device, in response to a write request of the host device. The storage device 100 may also be configured to provide the stored data to the host device in response to a read request of the host device.

The storage device 100 may include a personal computer memory card international association (PCMCIA) card, a smart media card, a memory stick, various multi-media cards (MMC, eMMC, RS-MMC, MMC-micro), various secure digital (SD, Mini-SD, Micro-SD) cards, a universal flash storage (UFS), or a solid state drive (SSD).

The storage device 100 may include a memory device 110 and a controller 120.

The memory device 110 may operate under the control of the controller 120. Operations of the memory device 110 may include a read operation, a write operation (that is, a program operation), an erase operation, and the like.

The memory device 110 may include a memory queue 111. The memory device 110 may store, in the memory queue 111, an operation command received from the controller 120.

The memory device 110 may perform grouped read operations under the control of the controller 120. Specifically, the memory device 110 may sequentially store, in the memory queue 111, a plurality of read commands RCMD1 to RCMDx received from the controller 120 and then sequentially output, to the controller 120, a plurality of data blocks DT1 to DTx respectively requested by the plurality of read commands RCMD1 to RCMDx. The memory device 110 may sequentially perform internal read operations on the respective data blocks DT1 to DTx in response to the respective read commands RCMD1 to RCMDx, and sequentially perform output operations on the respective data blocks DT1 to DTx. The internal read operations may partially overlap the output operations.

Examples of the memory device 110 may include various types of memories such as a NAND flash memory, a three-dimensional (3D) NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The controller 120 may control overall operations of the storage device 100. The controller 120 may control the memory device 110 according to a request of the host device. For example, the controller 120 may store data transmitted from the host device in the memory device 110 according to a write request of the host device. For example, the controller 120 may read data from the memory device 110 and transmit the read data to the host device according to a read request of the host device.

The controller 120 may also control the memory device 110 in order to perform internally necessary management operations independently of the host device, that is, even without receiving a request from the host device. For example, the management operation may include a wear leveling operation, a garbage collection operation, an erase operation, and the like. According to an embodiment, the management operation may also be performed at the request of the host device.

The controller 120 may efficiently process the plurality of read commands RCMD1 to RCMDx by controlling the memory device 110 to perform the grouped read operations. Specifically, the controller 120 may sequentially transmit the read commands RCMD1 to RCMDx to the memory device 110, and then sequentially receive the data blocks DT1 to DTx respectively corresponding to the read commands RCMD1 to RCMDx from the memory device 110.

According to an embodiment, the controller 120 may transmit a set command to the memory device 110 before transmitting the read commands RCMD1 to RCMDx. In response to the set command, the memory device 110 may set a queue depth of the memory queue 111 in which the read commands RCMD1 to RCMDx are to be stored. According to an embodiment, the queue depth of the memory queue 111 may represent a maximum number of read commands that can be enqueued into the memory queue 111 and may represent a maximum number of read commands that are supposed to be processed through the grouped read operations.

According to an embodiment, when a ready/busy signal (for example, RB in FIG. 2) outputted from the memory device 110 has a logic high level, the controller 120 may output a first read command RCMD1 among the read commands RCMD1 to RCMDx to the memory device 110. After receiving the first read command RCMD1, the memory device 110 may output the ready/busy signal RB at a logic low level while storing the first read command RCMD1 in the memory queue 111, and change the level of the ready/busy signal RB to a logic high level in order to receive a second read command subsequent to the first read command RCMD1 after storing the first read command RCMD1 in the memory queue 111. The controller 120 may subsequently transmit the second read command to the memory device 110 when the ready/busy signal RB has a logic high level.

The controller 120 may include a controller queue 121 in which operation commands to be transmitted to the memory device 110 are stored. The controller 120 may select the read commands RCMD1 to RCMDx satisfying a predetermined condition of the grouped read operations among operation commands stored in the controller queue 121. The predetermined condition may be that target memory regions of the read commands RCMD1 to RCMDx are included in substantially the same plane in the memory device 110 and a size of data requested by each of the read commands RCMD1 to RCMDx (hereinafter, referred to as a data size of a read command) is equal to or less than a reference size.

In summary, a read request for small-sized data, such as a random read request, may be frequently requested by the host device and may have a higher priority than other requests. However, when the operation commands of the controller queue 121 are processed one by one, the response time for the host device may increase due to the bottleneck of the controller queue 121. However, the storage device 100 of the present disclosure may process the plurality of read commands RCMD1 to RCMDx at once through grouped read operations, instead of processing the read commands one by one. Accordingly, the response time for the host device can be shortened. Processing the read commands RCMD1 to RCMDx at once when the controller queue 121 is full may bring about an effect of expanding the capacity of the controller queue 12.

Figure 2:
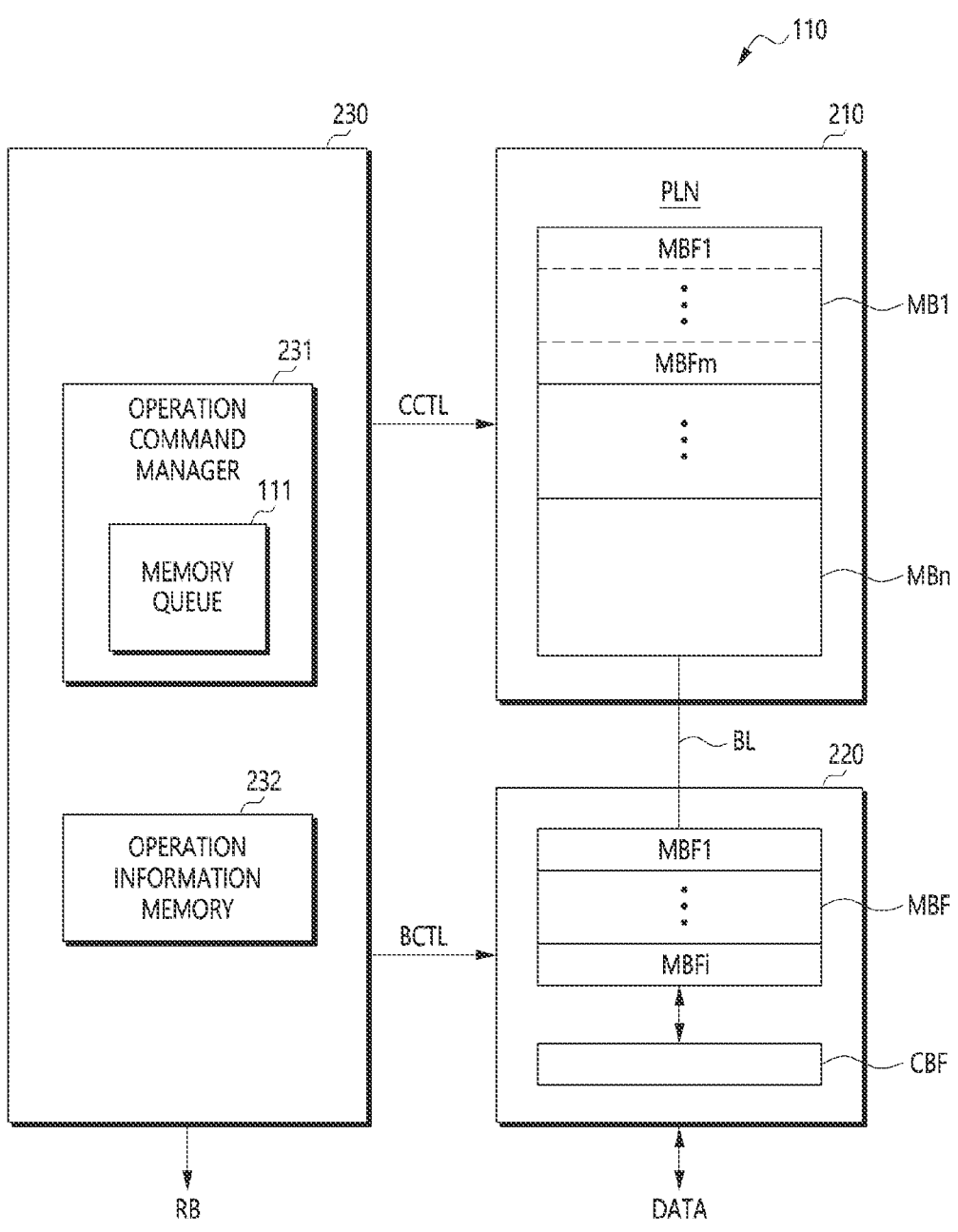
FIG. 2 is a block diagram illustrating a memory device of FIG. 1 in accordance with an embodiment of the present disclosure.

FIG. 2 is a block diagram illustrating the memory device 110 of FIG. 1 in accordance with an embodiment of the present disclosure.

Referring to FIG. 2, the memory device 110 may include a cell region 210, a buffer region 220, and a control circuit 230.

Data transmitted from a main buffer region MBF of the buffer region 220 may be stored in the cell region 210 in response to cell control signals CCTL transmitted from the control circuit 230. Data stored in the cell region 210 may be transmitted to the main buffer region MBF in response to the cell control signals CCTL.

The cell region 210 may include a plurality of memory blocks MB1 to MBn. The plurality of memory blocks MB1 to MBn may be connected in common to the main buffer region MBF through bit lines BL. Data read from the memory blocks MB1 to MBn or data to be stored in the memory blocks MB1 to MBn may be stored in the main buffer region MBF. The memory blocks MB1 to MBn sharing the main buffer region MBF may be included in substantially the same plane PLN.

Each memory block may be a unit in which the memory device 110 performs an erase operation. Data stored in each memory block may be erased together through an erase operation. Each memory block may include a plurality of memory regions MR1 to MRm. Each memory region may include a plurality of memory cells in which data is substantially stored. Memory cells included in each memory region may be connected to a common word line (not illustrated) and may be accessed through the word line.

Each memory cell may be used as a single level cell (SLC) or an extra level cell (XLC) according to density, that is, the number of bits stored in each memory cell. The XLC may indicate a multi-level cell (MLC) that stores 2 bits, a triple level cell (TLC) that stores 3 bits, a quad level cell (QLC) that stores 4 bits, or the like. The density of the memory cell may have a value from 1 to a maximum density. The maximum density may be determined according to the performance of the memory device 110 and the policy of the controller 120.

A memory region with a density of k may logically include k sub-regions, namely, pages. For example, the TLC memory region may logically include three pages, that is, a least significant bit (LSB) page (or page having the lowest level) in which LSB is stored, a central significant bit (CSB) page (or page having a central level) in which CSB is stored, and a most significant bit (MSB) page (or page having the highest level) in which MSB is stored. For example, the QLC memory region may logically include four pages, that is, an LSB page in which LSB is stored, a first CSB page (or page having a first central level) in which first CSB is stored, a second CSB page (or page having a second central level) in which second CSB is stored, and an MSB page in which MSB is stored.

The cell region 210 may further include one or more planes separate from the plane PLN. In such a case, the cell region 210 may further include one or more buffer regions respectively connected to the one or more planes. When the cell region 210 includes a plurality of planes, each plane may be connected to a corresponding buffer region.

In response to buffer control signals BCTL transmitted from the control circuit 230, the buffer region 220 may store data transmitted from the controller 120 before the corresponding data is stored in the cell region 210. In response to the buffer control signals BCTL, the buffer region 220 may also store data read from the cell region 210 before the corresponding data is outputted to the controller 120.

The buffer region 220 may further include the main buffer region MBF and a cache buffer CBF connected to each other. The main buffer region MBF may include a plurality of main buffers MBF1 to MBFi. The capacity of each of the main buffers MBF1 to MBFi and the cache buffer CBF may be equal to a page size (that is, page capacity). Each of the main buffers MBF1 to MBFi may be connected to the cell region 210. Data transmitted from the cell region 210 to any of the main buffers MBF1 to MBFi may be moved to the cache buffer CBF in order to be transmitted to the controller 120. Data transmitted from the controller 120 to the cache buffer CBF may be moved to any of the main buffers MBF1 to MBFi in order to be stored in the cell region 210.

The control circuit 230 may control internal operations of the memory device 110 under the control of the controller 120. Specifically, the control circuit 230 may generate one or more cell control signals CCTL and control the operation of the cell region 210 through the cell control signals CCTL. The control circuit 230 may generate one or more buffer control signals BCTL and control the operation of the buffer region 220 through the buffer control signals BCTL.

The control circuit 230 may generate the ready/busy signal RB for notifying the controller 120 of the state of the memory device 110, and transmit the ready/busy signal RB to the controller 120. The ready state may be a state in which the memory device 110 may receive the set command, the operation command, and the like from the controller 120. The ready state may be a state in which the memory device 110 may output data to the controller 120. The busy state may be a state in which the memory device 110 is performing at least one operation. The ready/busy signal RB may have a logic high level in the ready state and a logic low level in the busy state.

The control circuit 230 may receive, from the controller 120, the read commands RCMD1 to RCMDx for the grouped read operations. The control circuit 230 may sequentially store the read commands RCMD1 to RCMDx in the memory queue 111, and then control the cell region 210 and the buffer region 220 to perform the grouped read operations of outputting the respective data blocks DT1 to DTx requested by the respective read commands RCMD1 to RCMDx.

As described above, the grouped read operations may include an operation of sequentially performing internal read operations on respective data blocks and sequentially performing output operations on the respective data blocks. The internal read operations may partially overlap the output operations. Each of the internal read operations may include an operation of reading a corresponding data block from the cell region 210 to buffer the read data block into the buffer region 220. Each of the output operations may include an operation of outputting the buffered data block from the buffer region 220 to the controller 120.

More specifically, the grouped read operations may include: an operation of performing a first output operation after completing a first internal read operation on a first data block among the data blocks; and an operation of performing a second internal read operation on a second data block among the data blocks in parallel with the first output operation. The grouped read operations may further include an operation of performing a second output operation on the second data block after completing the second internal read operation and the first output operation.

According to an embodiment, the first output operation may include a first cache transfer operation and a first cache output operation. The cache transfer operation and cache output operation will be described with reference to FIGS. 6A to 6E. The control circuit 230 may output the ready/busy signal RB at a logic low level while performing the first internal read operation and the first cache transfer operation, change the level of the ready/busy signal RB to a logic high level after completing the first cache transfer operation, and output the ready/busy signal RB at a logic high level while performing the first cache output operation.

According to an embodiment, the second output operation may include a second cache transfer operation and a second cache output operation. After completing the second internal read operation, the control circuit 230 may change the level of the ready/busy signal RB to a logic low level, and output the ready/busy signal RB at a logic low level while performing the second cache transfer operation. After completing the second cache transfer operation, the control circuit 230 may change the level of the ready/busy signal RB to a logic high level, and output the ready/busy signal RB at a logic high level while performing the second cache output operation.

The control circuit 230 may include an operation command manager 231 and an operation information memory 232.

The operation command manager 231 may store, in the memory queue 111, the operation command received from the controller 120. The operation command manager 231 may allocate an index to the operation command and manage the operation command. The operation command manager 231 may identify the read commands RCMD1 to RCMDx for the grouped read operations and allocate an index to each of the read commands RCMD1 to RCMDx.

According to an embodiment, the operation command manager 231 may select, as an index, either a variable index or a fixed index according to a result of comparing the data size of the read command with the reference size and may allocate the selected index to the read command when storing the read command in the memory queue 111. The operation command manager 231 may select the variable index as the index when the data size is equal to or less than the reference size, and select the fixed index as the index when the data size exceeds the reference size. The reference size may be, for example, a page size.

Various information on the operation of the memory device 110 may be stored in the operation information memory 232. The information stored in the operation information memory 232 may include various parameters set by the controller 120. The control circuit 230 may store information in the operation information memory 232 and change the stored information under the control of the controller 120. As will be described below, the control circuit 230 may receive a set command for the grouped read operations from the controller 120, and store parameters included in the set command in the operation information memory 232. The parameters included in the set command may include a queue depth of the memory queue 111, a reference size, and the like.

The control circuit 230 may control the operation of the memory device 110 with reference to the operation information memory 232. The control circuit 230 may generate at least one of the cell control signals CCTL and the buffer control signals BCTL with reference to the operation information memory 232. The control circuit 230 may perform the grouped read operations with reference to the operation information memory 232.

According to an embodiment, the control circuit 230 may further include a report queue (not illustrated). The control circuit 230 may store a result of the operation performed by the memory device 110 in the report queue, and output the result to the controller 120 under the control of the controller 120. When performing the grouped read operations, the control circuit 230 may sequentially store, in the report queue, a plurality of results respectively corresponding to the plurality of read commands RCMD1 to RCMDx. Then, the control circuit 230 may sequentially output the plurality of results to the controller 120 under the control of the controller 120. Each of the queues included in the present disclosure may be configured as a hardware queue, a software queue, or a combination thereof.

Accordingly, the memory device 110 consecutively performs internal read operations respectively corresponding to the plurality of read commands RCMD1 to RCMDx and also consecutively performs output operations in parallel with the internal read operations, which makes it possible to greatly improve the latency of a read operation.

Figure 3:
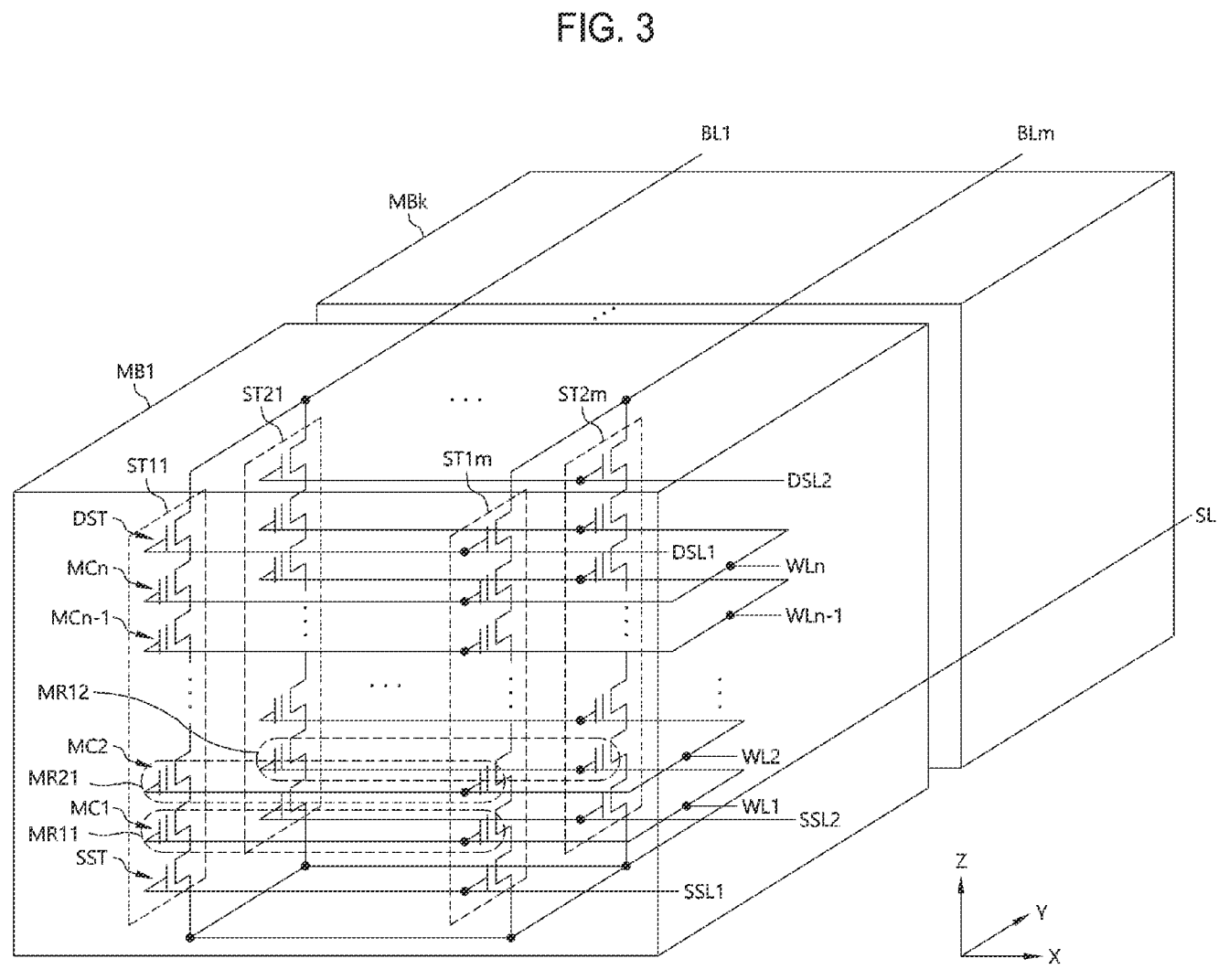

FIG. 3 is a circuit diagram illustrating a memory block MB1 in accordance with an embodiment of the present disclosure. Each of the memory blocks MB1 to MBn in FIG. 2 may be configured similarly to the memory block MB1 in FIG. 3.

Referring to FIG. 3, the memory block MB1 may include strings ST11 to ST1m and ST21 to ST2m. Each of the strings ST11 to ST1m and ST21 to ST2m may extend in a vertical direction (Z direction). Within the memory block MB1, m strings may be arranged in a row direction (X direction). FIG. 3 illustrates that two strings are arranged in a column direction (Y direction); however, this is for convenience of description and three or more strings may be arranged in the column direction (Y direction).

The strings ST11 to ST1m and ST21 to ST2m may be configured identically. For example, the string ST11 may include a source select transistor SST, memory cells MC1 to MCn, and a drain select transistor DST serially connected to one another between a source line SL and a bit line BL1. A source of the source select transistor SST may be connected to the source line SL, and a drain of the drain select transistor DST may be connected to the bit line BL1. The memory cells MC1 to MCn may be serially connected to one another between the source select transistor SST and the drain select transistor DST.

Gates of source select transistors of strings arranged in substantially the same row may be connected to substantially the same source select line. For example, gates of source select transistors of the strings ST11 to ST1m in a first row may be connected to a source select line SSL1. For example, gates of source select transistors of the strings ST21 to ST2m in a second row may be connected to a source select line SSL2. In another embodiment, source select transistors of the strings ST11 to ST1m and ST21 to ST2m may be connected in common to one source select line.

Gates of drain select transistors of strings arranged in substantially the same row may be connected to substantially the same drain select line. For example, gates of drain select transistors of the strings ST11 to ST1m in the first row may be connected to a drain select line DSL1. For example, gates of drain select transistors of the strings ST21 to ST2m in the second row may be connected to a drain select line DSL2.

Strings arranged in substantially the same column may be connected to substantially the same bit line. For example, the strings ST11 and ST21 in the first column may be connected to the bit line BL1. For example, the strings ST1$m$ and ST2$m$ in an $m^{th}$ column may be connected to a bit line BLm.

Gates of memory cells located at substantially the same location in the vertical direction may be connected to substantially the same word line. For example, in the strings ST11 to ST1$m$ and ST21 to ST2$m$, memory cells located at substantially the same location in the vertical direction as the memory cell MC1 may be connected to a word line WL1.

Among the memory cells, memory cells connected to substantially the same word line in substantially the same row may constitute one memory region. For example, memory cells connected to the word line WL1 in the first row may constitute one memory region MR11. For example, memory cells connected to the word line WL1 in the second row may constitute one memory region MR12. For example, memory cells connected to a word line WL2 in the first row may constitute one memory region MR21. Each word line may be connected to a plurality of memory regions MR1 to MRm according to the number of rows. Memory cells constituting one memory region may be programmed simultaneously.

According to an embodiment, the memory block MB1 may be further connected to one or more dummy word lines in addition to the word lines WL1 to WLn. In such a case, the memory block MB1 may further include dummy memory cells connected to the dummy word lines.

Figure 4:
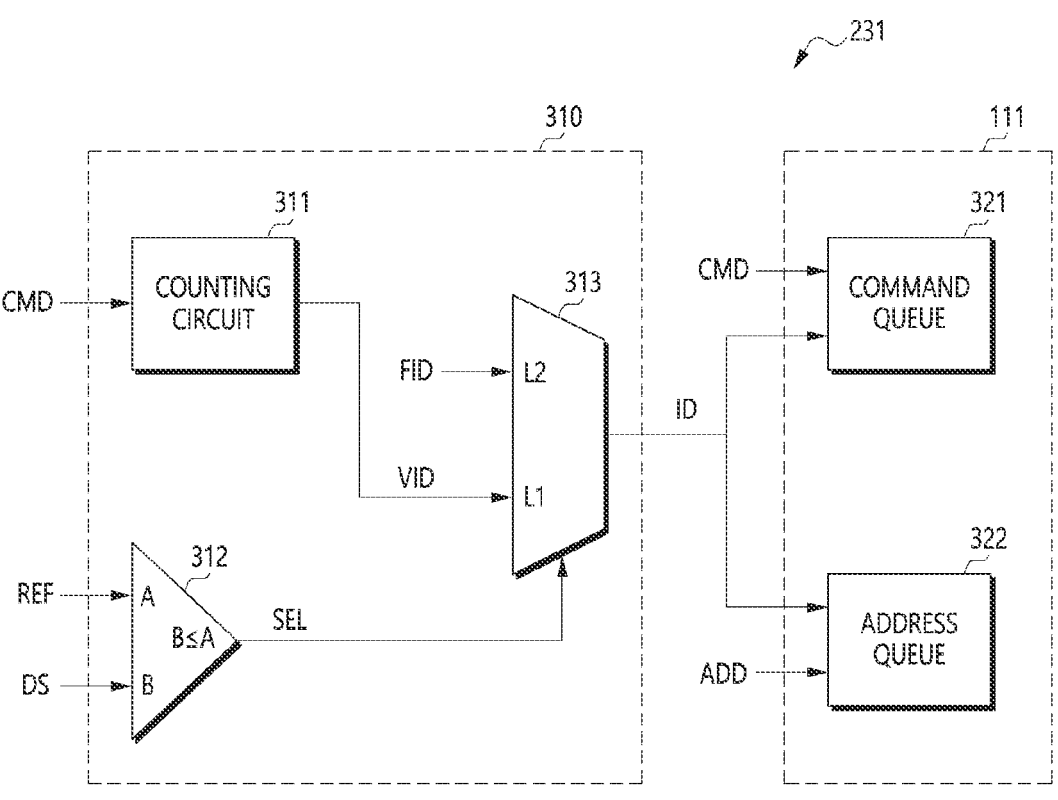
FIG. 4 is a block diagram illustrating an operation command manager in accordance with an embodiment of the present disclosure.

FIG. 4 is a block diagram illustrating the operation command manager 231 in accordance with an embodiment of the present disclosure.

Referring to FIG. 4, the operation command manager 231 may allocate an index ID to an operation command received from the controller 120. More specifically, when a command CMD and an address ADD included in the operation command are stored in the memory queue 111, the operation command manager 231 may allocate substantially the same index ID to the command CMD and address ADD. The command CMD included in the operation command may indicate an operation indicated by the operation command, and the address ADD may indicate a location to be accessed in the cell region 210. Upon receiving the operation command from the controller 120, the control circuit 230 may identify the command CMD and the address ADD from the operation command and input the command CMD and the address ADD to the operation command manager 231. When the operation command is a read command, the control circuit 230 may further identify a data size DS of the read command, that is, the size of data to be read in response to the read command, and input the data size DS to the operation command manager 231.

The operation command manager 231 may include an indexing circuit 310 and the memory queue 111.

The indexing circuit 310 may output an index ID to be allocated to the command CMD and the address ADD, in response to the command CMD. The indexing circuit 310 may include a counting circuit 311, a comparison circuit 312, and an index output circuit 313.

The counting circuit 311 may output a variable index VID in response to the command CMD. The counting circuit 311 may output the variable index VID that increases by 1 from 0 whenever the command CMD is received. The variable index VID may vary within a range corresponding to the queue depth of the memory queue 111. For example, when the queue depth of the memory queue 111 is k, the variable index VID may have a value between 0 and k−1.

The comparison circuit 312 may receive a reference size REF and the data size DS and output a selection signal SEL.

The comparison circuit 312 may output the selection signal SEL according to a result of comparing the reference size REF and the data size DS. Specifically, when the data size DS is equal to or less than the reference size REF, the comparator circuit 312 may output the selection signal SEL having a first level L1 (for example, logic high level or "1"). When the data size DS exceeds the reference size REF, the comparison circuit 312 may output the selection signal SEL having a second level L2 (for example, logic low level or "0"). The reference size REF may be, for example, a page size.

The index output circuit 313 may receive the variable index VID and a fixed index FID, and output the index ID in response to the selection signal SEL. The index output circuit 313 may output the variable index VID as the index ID when the selection signal SEL has the first level L1, and output the fixed index FID as the index ID when the selection signal SEL has the second level L2. The fixed index FID may be 0, for example.

The memory queue 111 may store the command CMD and the address ADD in response to the index ID. The memory queue 111 may include a command queue 321 and an address queue 322.

The command queue 321 may store the command CMD in response to the index ID. The command queue 321 may sequentially store a plurality of commands when a queue depth greater than 1 is set by the controller 120. For example, the command queue 321 may include a plurality of registers respectively corresponding to index values, and the plurality of commands may be stored in the registers, respectively. Accordingly, each of the commands may be identified with an allocated index.

The address queue 322 may store the address ADD in response to the index ID. The address queue 322 may sequentially store a plurality of addresses when the queue depth greater than 1 is set by the controller 120. For example, the address queue 322 may include a plurality of registers respectively corresponding to index values, and the plurality of addresses may be stored in the registers, respectively. Accordingly, each of the addresses can be identified with an allocated index.

When the grouped read operations is performed, the operation command manager 231 may operate as follows. First, a first read command among first to fourth read commands for the grouped read operations may be transmitted from the controller 120. When the command CMD included in the first read command is received, the counting circuit 311 may output the variable index VID as 0. The comparison circuit 312 may compare the data size DS included in the first read command with the reference size REF and output the selection signal SEL according to the comparison result. As described above, since the data size DS of the first read command is equal to or less than the reference size REF, the comparison circuit 312 may output the selection signal SEL having the first level L1 with respect to the first read command. The index output circuit 313 may transmit the variable index VID as the index ID to the memory queue 111 in response to the selection signal SEL having the first level L1. Accordingly, the command queue 321 may store the command CMD of the first read command in a register corresponding to index (ID) 0, and the address queue 322 may store the address ADD of the first read command in a register corresponding to the index (ID) 0, so that the index (ID) 0 may be allocated to the first read command. After the first read command is stored in the memory queue 111, the second read command may be transmitted from the controller 120. The operation command manager 231 may allocate indexes (IDs) 1 to 3 to the second to fourth read commands, respectively, similar to the processing of the first read command.

After all the first to fourth read commands are stored in the memory queue 111, the control circuit 230 may process the first to fourth read commands on the basis of the index ID, as will be described with reference to FIG. 6A to FIG. 6E.

When a read operation other than the grouped read operations is performed, the operation command manager 231 may operate as follows. First, one read command may be transmitted from the controller 120. When the command CMD included in the read command is received, the counting circuit 311 may output the variable index VID as 0. The comparison circuit 312 may compare the data size DS included in the read command with the reference size REF and output the selection signal SEL at the first level L1 or the second level L2 according to the comparison result. The index output circuit 313 may transmit the variable index (VID) 0 as the index ID to the memory queue 111 in response to the selection signal SEL having the first level L1. The index output circuit 313 may transmit the fixed index (FID) 0 as the index ID to the memory queue 111 in response to the selection signal SEL having the second level L2. The command queue 321 may store the command CMD included in the read command in response to the index ID, and the address queue 322 may store the address ADD included in the read command in response to the index ID.

Figure 5:
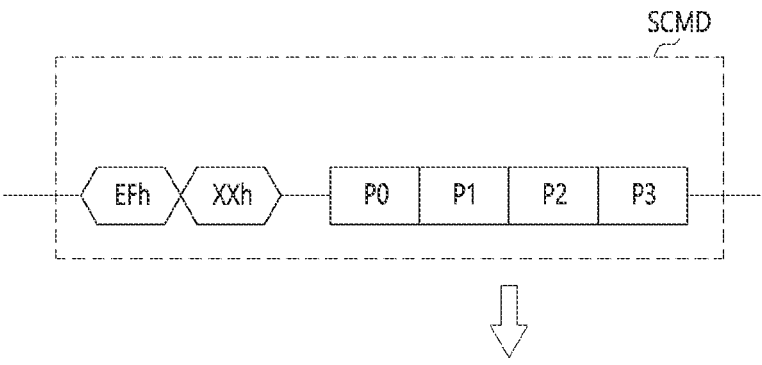
FIG. 5 is a diagram illustrating a structure of a set command in accordance with an embodiment of the present disclosure.

FIG. 5 is a diagram illustrating the structure of a set command SCMD in accordance with an embodiment of the present disclosure.

Referring to FIG. 5, the controller 120 may transmit the set command SCMD to the memory device 110 according to a predetermined specification with the memory device 110 so that the memory device 110 may perform the grouped read operations. The controller 120 may activate the grouped read operations through the set command SCMD, and set the queue depth of the memory queue 111 and the reference size REF. The memory device 110 may store first to fourth parameters P0 to P3 included in the set command SCMD in the operation information memory 232 in response to the set command SCMD.

Specifically, the set command SCMD may include a command EFh, an address XXh, and the first to fourth parameters P0 to P3. The command EFh may be, for example, a set feature command; however, the embodiment of the present disclosure is not limited thereto. The address XXh may indicate a location where the first to fourth parameters P0 to P3 are stored in the operation information memory 232.

The first parameter P0 may be used to activate the grouped read operations. The memory device 110 may activate the grouped read operations when the first parameter P0 has a predetermined value. Activating the grouped read operations may include setting the reference size REF in the operation command manager 231 on the basis of the second parameter P1 and setting each of the command queue 321 and the address queue 322 of the operation command manager 231 to have a queue depth greater than 1 on the basis of the third parameter P2.

The second parameter P1 may indicate the reference size REF. That is, the reference size REF may already be known by the memory device 110 or may be designated using the second parameter P1 by the controller 120. The controller 120 may select the page size as the reference size REF, and transmit the reference size REF as the second parameter P1 to the memory device 110.

The third parameter P2 may indicate the queue depth of the memory queue 111, that is, the queue depth of each of the command queue 321 and the address queue 322. The queue depth of each of the command queue 321 and the address queue 322 may mean the number of read commands to be processed together through the grouped read operations.

The fourth parameter P3 may be reserved. The number of parameters P0 to P3 being 4 may be an example.

The controller 120 may also deactivate the grouped read operations and set the queue depth to 1 through the set command SCMD so that the memory device 110 does not perform the grouped read operations.

FIG. 6A to FIG. 6E are diagrams illustrating a process in which the memory device 110 performs the grouped read operations in accordance with an embodiment of the present disclosure.

Figure 6A:
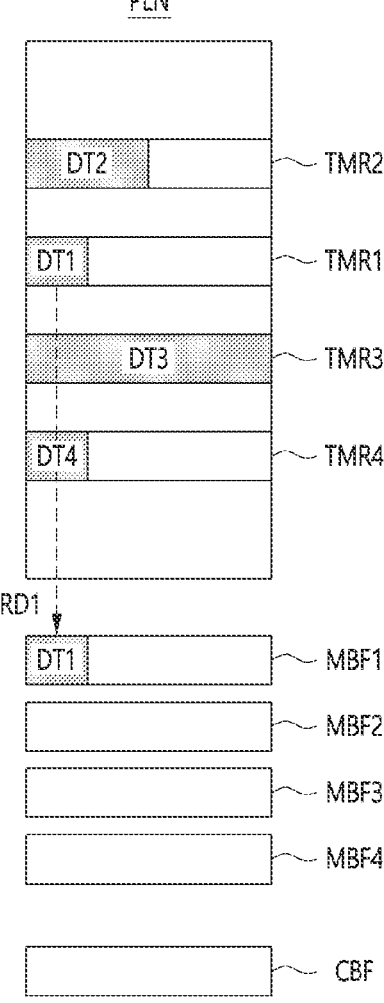
FIG. 6A to FIG. 6E are diagrams illustrating a process in which the memory device performs grouped read operations in accordance with an embodiment of the present disclosure.

Referring to FIG. 6A, the page size may be, for example, 16 KB. The memory device 110 may store the first to fourth read commands RCMD1 to RCMD4 in the memory queue 111, and then perform the grouped read operations, thereby processing the first to fourth read commands RCMD1 to RCMD4. The first to fourth read commands RCMD1 to RCMD4 may be used to read the first to fourth data blocks DT1 to DT4 of 4 KB, 8 KB, 16 KB, and 4 KB from first to fourth target memory regions TMR1 to TMR4, respectively. The first to fourth target memory regions TMR1 to TMR4 may be equally included in the plane PLN.

The memory device 110 may perform a first internal read operation RD1 of reading the first data block DT1 stored in the first target memory region TMR1 to a first main buffer MBF1.

Figure 6B:
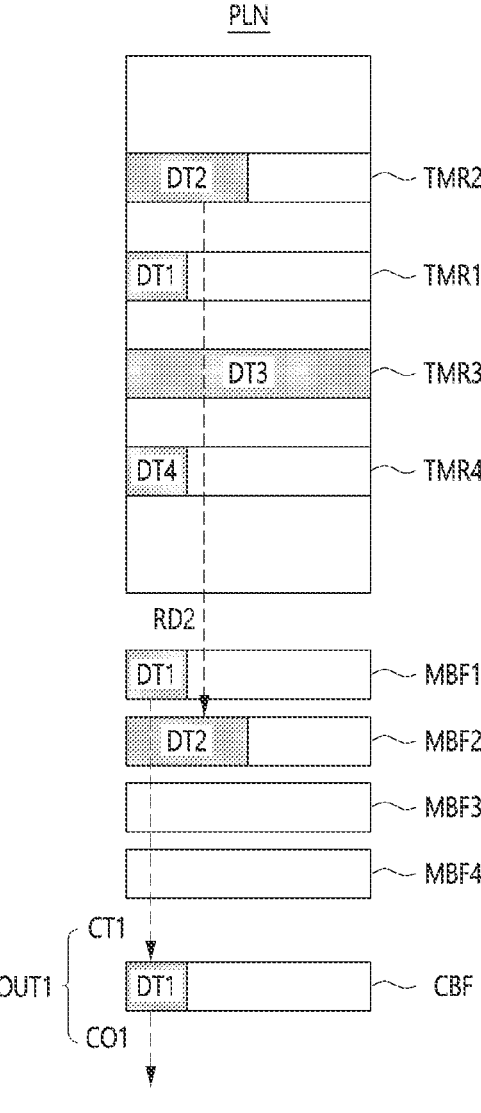

Referring to FIG. 6B, the memory device 110 may perform a first output operation OUT1 of outputting the first data block DT1 stored in the first main buffer MBF1 to the controller 120 after completing the first internal read operation RD1. The first output operation OUT1 may include a first cache transfer operation CT1 and a first cache output operation CO1. Specifically, the memory device 110 may perform the first cache transfer operation CT1 of moving the first data block DT1 stored in the first main buffer MBF1 to the cache buffer CBF, and perform the first cache output operation CO1 of outputting the first data block DT1 stored in the cache buffer CBF to the controller 120.

The memory device 110 may also perform a second internal read operation RD2 of reading the second data block DT2 stored in the second target memory region TMR2 to a second main buffer MBF2. The second internal read operation RD2 may be performed in parallel with the first output operation OUT1.

Figure 6C:
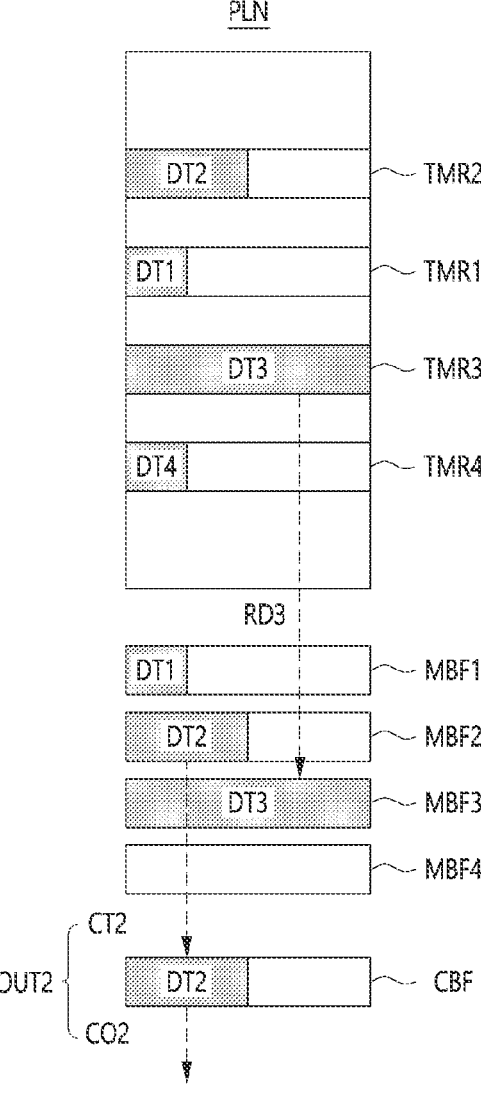

Referring to FIG. 6C, the memory device 110 may perform a second output operation OUT2 of outputting the second data block DT2 stored in the second main buffer MBF2 to the controller 120 after completing the second internal read operation RD2 and the first output operation OUT1. The second output operation OUT2 may include a second cache transfer operation CT2 and a second cache output operation CO2. Specifically, the memory device 110 may perform the second cache transfer operation CT2 of moving the second data block DT2 stored in the second main buffer MBF2 to the cache buffer CBF, and perform the second cache output operation CO2 of outputting the second data block DT2 stored in the cache buffer CBF to the controller 120.

The memory device 110 may also perform a third internal read operation RD3 of reading the third data block DT3 stored in the third target memory region TMR3 to a third main buffer MBF3. The third internal read operation RD3 may be performed in parallel with the second output operation OUT2.

Figure 6D:
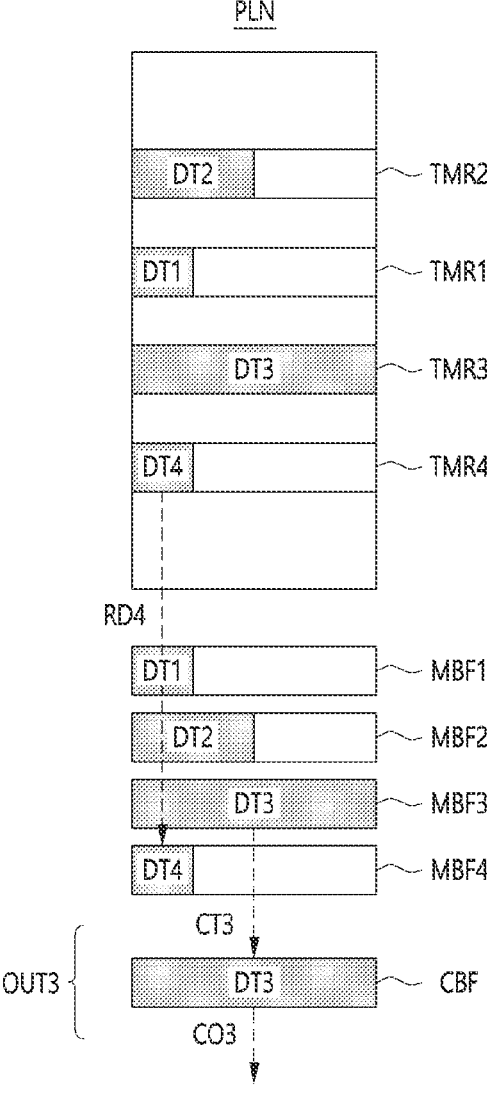

Referring to FIG. 6D, the memory device 110 may perform a third output operation OUT3 of outputting the third data block DT3 stored in the third main buffer MBF3 to the controller 120 after completing the third internal read operation RD3 and the second output operation OUT2. The third output operation OUT3 may include a third cache transfer operation CT3 and a third cache output operation CO3. Specifically, the memory device 110 may perform the third cache transfer operation CT3 of moving the third data block DT3 stored in the third main buffer MBF3 to the cache buffer CBF, and perform the third cache output operation CO3 of outputting the third data block DT3 stored in the cache buffer CBF to the controller 120.

The memory device 110 may also perform a fourth internal read operation RD4 of reading the fourth data block DT4 stored in the fourth target memory region TMR4 to a fourth main buffer MBF4. The fourth internal read operation RD4 may be performed in parallel with the third output operation OUT3.

Figure 6E:
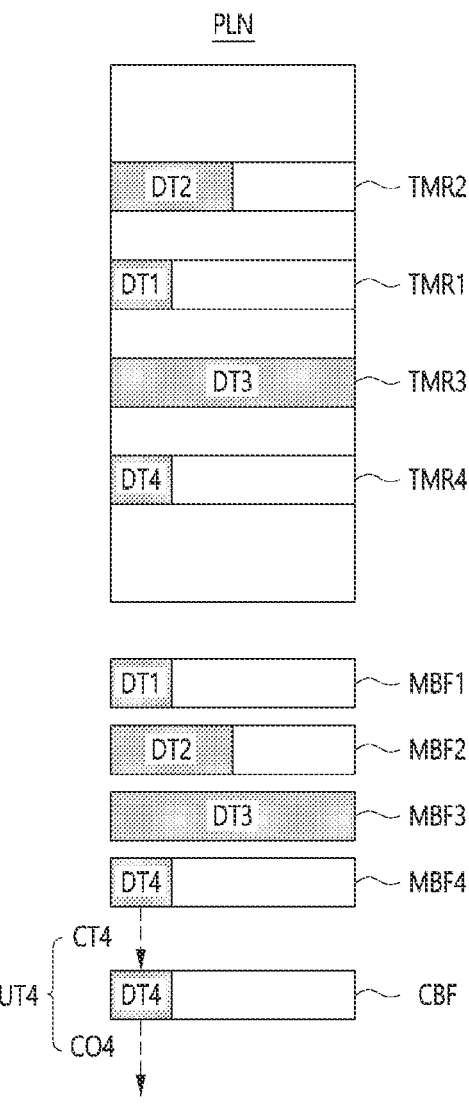

Referring to FIG. 6E, the memory device 110 may perform a fourth output operation OUT4 of outputting the fourth data block DT4 stored in the fourth main buffer MBF4 to the controller 120 after completing the fourth internal read operation RD4 and the third output operation OUT3. The fourth output operation OUT4 may include a fourth cache transfer operation CT4 and a fourth cache output operation CO4. Specifically, the memory device 110 may perform the fourth cache transfer operation CT4 of moving the fourth data block DT4 stored in the fourth main buffer MBF4 to the cache buffer CBF and perform the fourth cache output operation CO4 of outputting the fourth data block DT4 stored in the cache buffer CBF to the controller 120.

In summary, the first to fourth internal read operations RD1 to RD4 may partially overlap the first to fourth output operations OUT1 to OUT4, which makes it possible to greatly reduce the latency for processing the first to fourth read commands RCMD1 to RCMD4.

Figure 7A:
FIG. 7A and FIG. 7B are timing diagrams illustrating a process in which the storage device performs grouped read operations in accordance with an embodiment of the present disclosure.
Figure 7B:
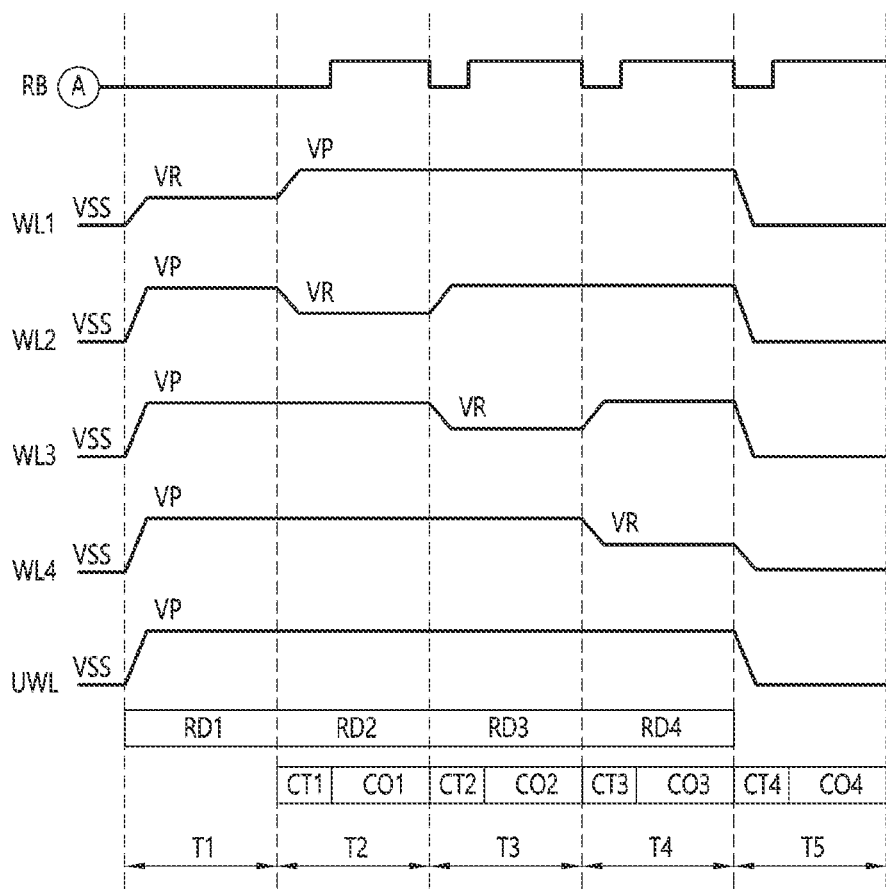

FIG. 7A and FIG. 7B are timing diagrams illustrating a process in which the storage device 100 performs the grouped read operations in accordance with an embodiment of the present disclosure.

Referring to FIG. 7A, the controller 120 may transmit the set command SCMD to the memory device 110 when the ready/busy signal RB has a logic high level. The controller 120 may set the queue depth of the memory queue 110 to 4 through the set command SCMD. The memory device 110 may activate the grouped read operations in response to the set command SCMD.

Subsequently, the controller 120 may transmit the first read command RCMD1 to the memory device 110. In a period Q1, the memory device 110 may store the first read command RCMD1 in the memory queue 111. In the period Q1, the memory device 110 may output the ready/busy signal RB at a logic low level while storing the first read command RCMD1 in the memory queue 111. The controller 120 may wait without transmitting the second read command RCMD2 to the memory device 110 in response to the ready/busy signal RB having a logic low level. After storing the first read command RCMD1 in the memory queue 111, the memory device 110 may change the level of the ready/busy signal RB to a logic high level in order to subsequently receive the second read command RCMD2. The controller 120 may transmit the second read command RCMD2 to the memory device 110 in response to the ready/busy signal RB having a logic high level.

Similar to the description of the first read command RCMD1, the controller 120 may sequentially transmit the second to fourth read commands RCMD2 to RCMD4, and the memory device 110 may sequentially store the second to fourth read commands RCMD1 to RCMD4 in the memory queue 111 in periods Q2 to Q4 whenever the second to fourth read commands RCMD1 to RCMD4 are received. When the memory queue 111 is full, the memory device 110 may determine that all read commands for the grouped read operations have been received.

Referring to FIG. 7B, in periods T1 to T5, the first to fourth internal read operations RD1 to RD4, the first to fourth cache transfer operations CT1 to CT4, and the first to fourth cache output operations CO1 to CO4 described with reference to FIG. 6A to FIG. 6E may be performed. The first to fourth word lines WL1 to WL4 may be word lines respectively connected to the first to fourth target memory regions TMR1 to TMR4.

Specifically, before the period T1, a ground voltage VSS may be applied to the first to fourth word lines WL1 to WL4 and the remaining word lines UWL connected to the plane PLN. In the period T1, in order to perform the first internal read operation RD1, the control circuit 230 may apply a read voltage VR to the first word line WL1, and apply a pass voltage VP higher than the read voltage VR to the second to fourth word lines WL2 to WL4 and the remaining word lines UWL. The control circuit 230 may output the ready/busy signal RB at a logic low level while performing the first internal read operation RD1.

Subsequently, in the period T2, the control circuit 230 may output the ready/busy signal RB at a logic low level while performing the first cache transfer operation CT1, and change the level of the ready/busy signal RB to a logic high level after completing the first cache transfer operation CT1. The control circuit 230 may output the ready/busy signal RB at a logic high level and then perform the first cache output operation CO1. In response to the ready/busy signal RB having a logic high level, the controller 120 may control the memory device 110 to perform the first cache output operation CO1. For example, the controller 120 may transmit a clock signal to the memory device 110, and the memory device 110 may transmit the first data block DT1 synchronized with the clock signal to the controller 120.

Then, the control circuit 230 may apply the read voltage VR to the second word line WL2 in order to perform the second internal read operation RD2, and apply the pass voltage VP to the first, third, and fourth word lines WL1, WL3, and WL4 and the remaining word lines UWL. After completing the second internal read operation RD2, the control circuit 230 may change the level of the ready/busy signal RB to a logic low level.

Subsequently, in the period T3, the control circuit 230 may output the ready/busy signal RB at a logic low level while performing the second cache transfer operation CT2, and change the level of the ready/busy signal RB to a logic high level after completing the second cache transfer operation CT2. The control circuit 230 may output the ready/busy signal RB at a logic high level and then perform the second cache output operation CO2. In response to the ready/busy signal RB having a logic high level, the controller 120 may control the memory device 110 to perform the second cache output operation CO2. For example, the controller 120 may transmit a clock signal to the memory device 110, and the memory device 110 may transmit the second data block DT2 synchronized with the clock signal to the controller 120.

Then, the control circuit 230 may apply the read voltage VR to the third word line WL3 in order to perform the third internal read operation RD3, and apply the pass voltage VP to the first, second, and fourth word lines WL1, WL2, and WL4 and the remaining word lines UWL. After completing the third internal read operation RD3, the control circuit 230 may change the level of the ready/busy signal RB to a logic low level.

Subsequently, in the period T4, the control circuit 230 may output the ready/busy signal RB at a logic low level while performing the third cache transfer operation CT3, and change the level of the ready/busy signal RB to a logic high level after completing the third cache transfer operation CT3. The control circuit 230 may output the ready/busy signal RB at a logic high level and then perform the third cache output operation CO3. In response to the ready/busy signal RB having a logic high level, the controller 120 may control the memory device 110 to perform the third cache output operation CO3. For example, the controller 120 may transmit a clock signal to the memory device 110, and the memory device 110 may transmit the third data block DT3 synchronized with the clock signal to the controller 120.

Then, the control circuit 230 may apply the read voltage VR to the fourth word line WL4 in order to perform the fourth internal read operation RD4, and apply the pass voltage VP to the first to third word lines WL1 to WL3 and the remaining word lines UWL. After completing the fourth internal read operation RD4, the control circuit 230 may change the level of the ready/busy signal RB to a logic low level.

Subsequently, in the period T5, the control circuit 230 may output the ready/busy signal RB at a logic low level while performing the fourth cache transfer operation CT4, and change the level of the ready/busy signal RB to a logic high level after completing the fourth cache transfer operation CT4. The control circuit 230 may output the ready/busy signal RB at a logic high level and then perform the fourth cache output operation CO4. In response to the ready/busy signal RB having a logic high level, the controller 120 may control the memory device 110 to perform the fourth cache output operation CO4. For example, the controller 120 may transmit a clock signal to the memory device 110, and the memory device 110 may transmit the fourth data block DT4 synchronized with the clock signal to the controller 120.

In summary, the controller 120 and the memory device 110 may process the first to fourth read commands RCMD1 to RCMD4 as the grouped random read operations, which makes it possible to greatly improve the operating performance of the storage device 100.

The above description is merely intended to illustratively describe the technical spirit of the present disclosure, and various changes and modifications can be made by those skilled in the art to which the present disclosure pertains without departing from the essential features of the present disclosure. Therefore, the embodiments disclosed in the present disclosure are not intended to limit the technical spirit of the present disclosure, but are intended to describe the present disclosure. The scope of the technical spirit of the present disclosure is not limited by these embodiments. The scope of the present disclosure should be interpreted by the accompanying following claims and all technical spirits falling within the equivalent scope thereto should be interpreted as being included in the scope of the present disclosure. Furthermore, the embodiments may be combined to form additional embodiments.

What is claimed is:

1. A memory device comprising:
a cell region;
a buffer region; and
a control circuit configured to:
set a queue depth of a queue in response to a set command received from a controller external to the memory device;
sequentially store a number of read commands received from the controller in the queue, the number corresponding to the queue depth; and
after the queue is full of the read commands, control the cell region and the buffer region to perform grouped read operations of outputting respective data blocks requested by the respective read commands.

2. The memory device according to claim 1,
wherein the grouped read operations comprise sequential internal read operations on the respective data blocks and sequential output operations on the respective data blocks, and
wherein the internal read operations partially overlap the output operations.

3. The memory device according to claim 2,
wherein each of the internal read operations comprises reading a corresponding data block from the cell region to buffer the read data block into the buffer region, and
wherein each of the output operations comprises outputting the read buffered data block from the buffer region to an outside.

4. The memory device according to claim 1, wherein the grouped read operations comprise:
performing a first output operation after completing a first internal read operation on a first data block among the data blocks; and
performing a second internal read operation on a second data block among the data blocks in parallel with the first output operation.

5. The memory device according to claim 4, wherein the grouped read operations further comprise performing a second output operation on the second data block after completing the second internal read operation and the first output operation.

6. The memory device according to claim 5,
wherein the control circuit is further configured to output a ready/busy signal to notify the controller of a state of the memory device,
wherein the first output operation comprises a first cache transfer operation and a first cache output operation, and
wherein the control circuit is further configured to:
output the ready/busy signal at a logic low level while performing the first internal read operation and subsequently performing the first cache transfer operation,
change a level of the ready/busy signal to a logic high level after completing the first cache transfer operation, and
output the ready/busy signal at the logic high level while performing the first cache output operation.

7. The memory device according to claim 6,
wherein the second output operation comprises a second cache transfer operation and a second cache output operation, and
wherein the control circuit is further configured to:
change the level of the ready/busy signal to the logic low level after completing the second internal read operation, and output the ready/busy signal at the logic low level while performing the second cache transfer operation.

8. The memory device according to claim 7, wherein the control circuit is further configured to:

change the level of the ready/busy signal to the logic high level after completing the second cache transfer operation, and output the ready/busy signal at the logic high level while performing the second cache output operation.

9. The memory device according to claim 1, wherein the control circuit comprises an operation command manager configured to:

assign an index to a read command according to a result of comparing a page size with a data size of the read command, and store the read command in a register included in the queue, the register corresponding to the index assigned to the read command.

10. The memory device according to claim 9, wherein the operation command manager sequentially assigns the index to the read commands when the data size of each of the read commands is equal to or less than the page size and assigns the index having a predetermined value to the read command when the data size of the read command exceeds the page size.

11. The memory device according to claim 1, wherein the control circuit is further configured to output a ready/busy signal to notify the controller of a state of the memory device, and wherein the control circuit is further configured to:

receive a first read command among the read commands, output the ready/busy signal at a logic low level while storing the first read command in the queue, and change a level of the ready/busy signal to a logic high level to receive a second read command subsequent to the first read command after storing the first read command in the queue.

12. A memory device comprising:

a cell region including a plurality of pages; and a control circuit configured to:

assign an index to read commands such that each read command is stored in a register in a queue, the register corresponding to the index assigned to the read command, and sequentially process the read commands in the order of the index, wherein the index is sequentially assigned to the read commands when a data size of each of the read commands is equal to or less than a page size, and the index having a predetermined value is assigned to a read command when the data size of the read command exceeds the page size.

13. The memory device according to claim 12, wherein the page size is a capacity of a page included in the cell region.

14. The memory device according to claim 12, wherein the control circuit sets a queue depth in response to a set command, and wherein the index is assigned to the read commands within a range corresponding to the queue depth.

15. A storage device comprising:

a memory device configured to set, in response to a set command, a queue depth of a queue in which read commands are to be stored; and a controller external to the memory device, the controller configured to:

transmit the set command to the memory device to cause the memory device to set the queue depth, sequentially transmit the read commands to the memory device, a number of the read commands corresponding to the queue depth, and after transmitting all of the read commands, sequentially receive data blocks respectively corresponding to the read commands from the memory device.

16. The storage device according to claim 15, wherein the memory device is configured to:

receive the read commands, sequentially perform internal read operations on the respective data blocks, and sequentially perform output operations on the respective data blocks, and wherein the internal read operations partially overlap the output operations.

17. The storage device according to claim 15, wherein the controller is further configured to select the read commands satisfying a predetermined condition, and wherein the predetermined condition is that target memory regions of the read commands are included in substantially the same plane in the memory device and a data size of each of the read commands is equal to or less than a page size.

18. The storage device according to claim 15, wherein the memory device is further configured to output a ready/busy signal to notify the controller of a state of the memory device, and wherein the controller transmits a first read command among the read commands to the memory device when the ready/busy signal outputted from the memory device has a logic high level, and wherein the memory device is configured to:

output, after receiving the first read command, the ready/busy signal at a logic low level while storing the first read command in the queue, and change a level of the ready/busy signal to a logic high level in order to receive a second read command subsequent to the first read command after storing the first read command in the queue.

\* \* \* \* \*